Mar. 20, 1923.
C. W. GRAHAM.
APPARATUS FOR ASSEMBLING CAN END LINERS WITH CAN ENDS.
ORIGINAL FILED JULY 18, 1916.
1,448,840.
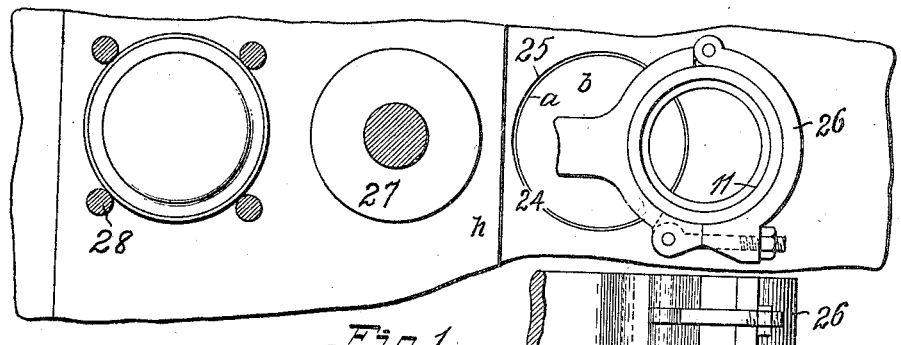
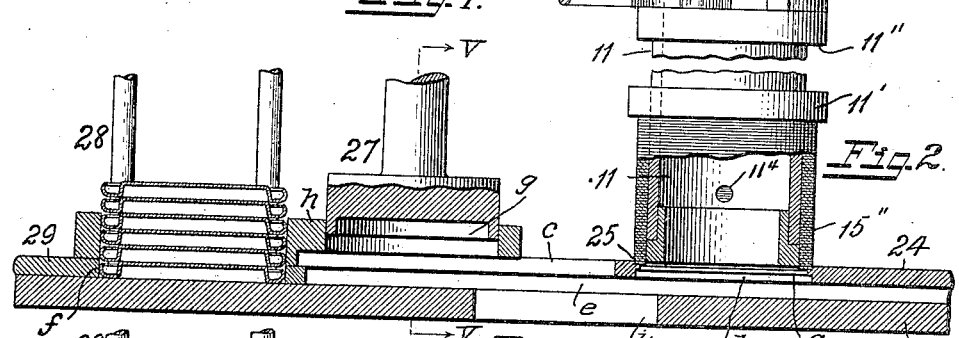
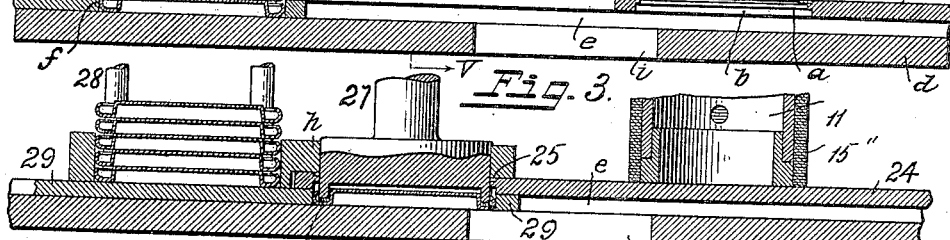
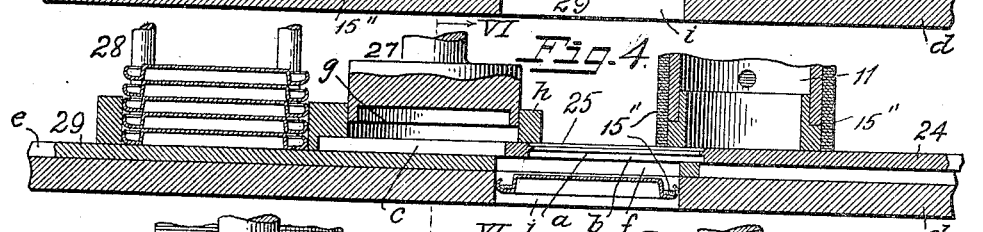
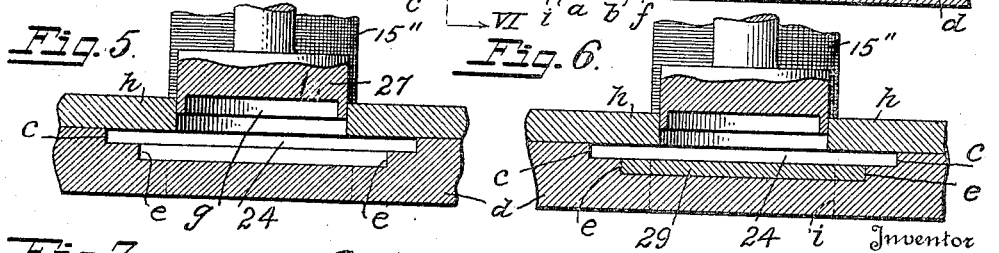
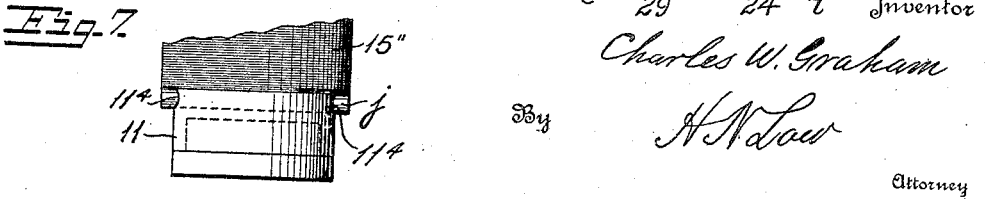
Inventor
Charles W. Graham
By H. N. Low
Attorney Patented Mar. 20, 1923.

1,448,840

UNITED STATES PATENT OFFICE.

CHARLES W. GRAHAM, OF ALLENDALE, NEW JERSEY, ASSIGNOR TO AMERICAN CAN COMPANY, OF NEW YORK, N. Y., A CORPORATION OF NEW JERSEY.

APPARATUS FOR ASSEMBLING CAN-END LINERS WITH CAN ENDS.

Original application filed July 18, 1916, Serial No. 109,943. Patent No. 1,355,040, dated October 5, 1920. Divided and this application filed August 28, 1920. Serial No. 406,672.

*To all whom it may concern:*

Be it known that I, CHARLES W. GRAHAM, a citizen of the United States, residing at Allendale, in the county of Bergen and State of New Jersey, have invented certain new and useful Improvements in Apparatus for Assembling Can-End Liners with Can Ends; of which the following is a specification.

The invention relates to assembling ring liners with can ends, said liners having been cut or formed as more fully set forth in my application Serial No. 109,943, filed July 18, 1916, now Patent No. 1,355,040, granted Oct. 5, 1920, of which this application is a division; but it will be understood that the ring liners may be prepared in any other suitable manner to be operated on by the mechanism of the present application.

The object of the invention is to simplify and make accurate the assembling process, so that the ring liners will be rapidly and perfectly seated within the grooves or recesses of the can ends, so that they can not be displaced therefrom and with the result that the can sealing operation will produce a perfect hermetic seam; further objects of the invention are to simplify the mechanism and make its operation rapid and economical.

The figures of the drawing show parts of a lining and assembling machine, illustrating particularly just how a stack of can end liners is held in stack formation by means of a holding core, and the individual liners handled and inserted into the feed mechanism of a lining machine, whereby individual liners are automatically stripped from the stack and successively alined with can ends and then assembled therewith.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Fig. 1 shows a plan view of the clamp for holding the stack core 11 in an inverted position, and a plan of a can end stack and the assembling means.

Fig. 2 is a vertical sectional view showing the inverted stack 11 in operative relation with a movable liner feed member, the assembling plunger and the stack of can ends and the feed member for the can ends.

Fig. 3 is a similar sectional view to Fig. 2 but showing the liner feed member and the can end feed member each advanced into alignment with the assembling plunger, and the assembling plunger having moved the liner through the orifice of the feed member onto the flange of the can end.

Fig. 4 is a similar sectional view to Fig. 3 showing the liner feed member returning and the can end feed member discharging the lined can end.

Figs. 5 and 6 are sectional views on lines V—V and VI—VI of Figs. 2 and 4 showing the guide-ways for the slide members feeding the can ends and liners.

Fig. 7 is a side view showing the lower end of the liner core after the same has been inverted and before it has been fixed in the assembling machine.

Referring to the drawings, 11 indicates a stack core upon which the liners 15", of paper or other suitable material are closely fitted, being stacked vertically one upon the other and having their inner edges in close engagement with the core (Fig. 2). The ring liners may be arranged in this manner on the core by any suitable means or method, but I prefer those disclosed in my said application. 11' is a ring weight or follower resting on the topmost liner and aiding in the feed of the liners downward as the bottommost liners are successively removed. This weight will be of sufficient amount for the purpose. The upper end of the core 11 is held in a clamping means 26 (Figs. 1 and 2), which will be supported from any suitable part of the assembling machine. The bottommost liner rests in a seat or recess 25 in which the liner fits accurately. This recess is exactly or substantially of a depth equal to the vertical thickness of a single liner, said recess being formed in the top of a feed plate or slide 24. The bottom of the recess is formed by a shoulder $a$ which projects inward for a short distance under the outer edge of the bottom-most ring liner. Below the shoulder $a$ is an orifice $b$ opening at the under side of the feed plate and of a diameter substantially equal to the diameter of the can ends with which the liners are to be assembled. $c$ indicates the guides (Figs. 5 and 6) in which the feed plate is reciprocated, by a mechanism of suitable character (not shown). These guides are formed in a frame or table element $d$, and, immediately below and preferably in contact with the feed plate 24 is arranged a can end feed member or slide 29 which is reciprocated by any suitable means and is directed by guides $e$. 28 is a stack holder for can ends arranged just above the feed member 29 and so that, in the reciprocation of said feed member, the lowermost can ends will successively drop into an aperture $f$ formed in said feed member (Fig. 2). It will be understood that the liner feed plate 24 and the can end feed member 29 are reciprocated oppositely to each other, or in such suitable directions, as to successively carry the bottommost ring liner and the bottommost can end to a common point in which said parts will be alined with each other (Fig. 3), and at such point is arranged an assembling member or plunger 27. This plunger has an annular bottom edge $g$ of such diameter as to fit closely within the shoulder $a$ and press the liner downward off said shoulder and into the recess of the can end, as shown in Fig. 3. $h$ indicates a guide for the plunger 27, and its operating mechanism may be of any known character not necessary to be herein illustrated.

After the assemblage of the liner with the can end, as shown in Fig. 3, the plunger 27 rises and the feed member 29 makes a further movement, to the right hand in Fig. 4, so as to drop said assembled article through an aperture $i$ in the table to a can end stack, similar to the stack shown at 28, or to other desired place of deposit.

It will be understood that the core 11 originally received the liners 15'' as they were cut, the present lower end of the core or stack holder being then uppermost, and the weight 11' being at the bottom of the stack and resting on the shoulder 11'' so as to support the then bottommost liner. After the holder in such position had received a complete stack of liners a pin $j$ (Fig. 7) would be inserted through the holes $11^4$ to retain the liners on the holder when the latter would be inverted to its present position (shown in Fig. 7). After the core 11 is firmly clamped in the device 26 at such height that the lower end of the core is exactly at the plane of the top surface of the feed plate 24 the pin is removed from the hole $11^4$, whereupon the stack of liners under the influence of the weight 11', descends until the lowermost liner is seated in the recess 25, as shown in said figure. The liner holder is then depending and is entirely free at its lower end for the removal of the liners by the recess 25 and the support of the remaining liners by the top surface of the feed plate, as seen in Fig. 3.

What is claimed is—

1. The combination of a holder for a stack of formed ring liners, a reciprocable feed slide formed with a recess adapted to register with the endmost liner of said stack, said recess being adapted to support only the outer peripheral portion of said ring liner, and having within the same an aperture through which the ring liner is adapted to be fed for assembling with a can end when the latter is aligned with said aperture, and means for feeding can ends successively into said aligned position.

2. In a machine for assembling ring liners with can ends the combination of a ring liner stack holder in the form of a core which is closely encircled by the stack of liners, said core depending from a support which holds the bottom end of the core rigidly immovable, and a recessed feed member movable under the bottom end of the core and towards and from the core for receiving ring liners in said recess and removing them successively from the core, the recess of the feed member being open for the passage of the ring liners through the same.

3. In a machine for assembling ring liners with can ends the combination of a ring liner stack holder in the form of a core which is closely encircled by the stack of liners, said core depending from a support which holds the bottom end of the core rigidly immovable, and a recessed feed member movable under the bottom end of the core and towards and from the core for receiving ring liners in said recess and removing them successively from the core, the bottom edge of the core coinciding in height with the top edge of said recess when the latter is alined with the core, the recess of the feed member being open for the passage of the ring liners through the same.

4. In a machine for assembling ring liners with can ends the combination of an invertible ring liner stack holder in the form of a core which is closely encircled by the stack of liners, said core depending from a support which holds the bottom end of the core rigidly immovable, removable means on said core near its free end for supporting the stacked ring liners, and a recessed feed member movable under the bottom end of the core and towards and from the core for receiving ring liners in said recess and removing them successively from the core.

5. In a machine for assembling ring liners with can ends, the combination of a reciprocating liner feed slide having an orifice therethrough which is formed with a narrow inwardly projecting shoulder, forming a recess in the top of the feed slide of a depth equal to the thickness of a ring liner, said slide being adapted to position the liners successively at an assembling station, a liner stack holder in the form of a core which is closely encircled by the stack of liners, said core depending to the said feed slide and having its lower end in the plane of the top of said slide, means for rigidly supporting the upper end of said core, means for alining can ends successively with the ring liners carried by said liner slide, and means for assembling the liners with the can ends when they are so alined with each other.

6. In a machine for assembling ring liners with can ends, the combination of a reciprocating liner feed slide having an orifice therethrough which is formed with a narrow inwardly projecting shoulder, forming a recess in the top of the feed slide of a depth equal to the thickness of a ring liner, said slide being adapted to position the liners successively at an assembling station, a liner stack holder in the form of a core which is closely encircled by the stack of liners, said core depending to the said feed slide and having its lower end in the plane of the top of said slide, means for rigidly supporting the upper end of said core, a can end feed slide reciprocating oppositely to said liner slide and adapted to position at an assembling station a can end under and in vertical alinement with the said orifice in the liner feed slide, assembling means for seating the ring liners successively on the can end when at said station of alinement, and means for supplying can ends successively to be fed by said can end feed slide.

7. In a machine for assembling ring liners with can ends, the combination of a reciprocating liner feed slide having an orifice therethrough which is formed with a narrow inwardly projecting shoulder, forming a recess in the top of the feed slide of a depth equal to the thickness of a ring liner, said slide being adapted to position the liners successively at an assembling station, a liner stack holder in the form of a core which is closely encircled by the stack of liners, said core depending to the said feed slide and having its bottom peripheral edge coinciding in height with the edge of said orifice in the feed slide, means for rigidly supporting the upper end of said core, a can end feed slide reciprocating oppositely to said liner slide and adapted to position at said assembling station a can end under and in vertical alinement with the said orifice in the liner feed slide, assembling means for seating the ring liners successively on the can end when at said station of alinement, and means for supplying can ends successively to be fed by said can end feed slide.

8. In a machine for assembling ring liners with can ends, the combination of a reciprocating liner feed slide having an orifice therethrough which is formed with a narrow inwardly projecting shoulder, forming a recess in the top of the feed slide of a depth equal to the thickness of a ring liner, said slide being adapted to position the liners successively at an assembling station, a liner stack holder in the form of a core which is closely encircled by the stack of liners, said core depending to the said feed slide and having its lower end in the plane of the top of said slide, means for rigidly supporting the upper end of said core, a can end feed slide reciprocating oppositely to said liner slide and adapted to position at said assembling station a can end under and in vertical alignment with the said orifice in the liner feed slide, assembling means for seating the ring liners successively on the can end when at said station of alinement, and means for supplying can ends successively to be fed by said can end feed slide, and means whereby a further movement of the can end slide beyond the assembling station releases and delivers the lined can end.

In testimony whereof I affix my signature.

CHARLES W. GRAHAM.